United States Patent [19]

Ahlin et al.

[11] Patent Number: 5,321,840
[45] Date of Patent: Jun. 14, 1994

[54] DISTRIBUTED-INTELLIGENCE COMPUTER SYSTEM INCLUDING REMOTELY RECONFIGURABLE, TELEPHONE-TYPE USER TERMINAL

[75] Inventors: Leo Ahlin, Ontario, Canada; Joseph C. Kawan, Hollywood, Calif.

[73] Assignee: Transaction Technology, Inc., Santa Monica, Calif.

[21] Appl. No.: 104,931

[22] Filed: Aug. 12, 1993

Related U.S. Application Data

[63] Continuation of Ser. No. 439,739, Nov. 21, 1989, abandoned, which is a continuation-in-part of Ser. No. 190,440, May 5, 1988, Pat. No. 4,991,199, which is a continuation-in-part of Ser. No. 260,832, Oct. 21, 1988, Pat. No. 5,008,927.

[51] Int. Cl.$^5$ .............................................. G06F 9/06
[52] U.S. Cl. ........................... 395/700; 364/DIG. 2; 364/918; 364/919.4; 364/935; 364/946.2; 364/918.7
[58] Field of Search .... 364/DIG. 1 MS, DIG. 2 MS; 395/200, 275, 325, 375, 425, 600, 700, 775, 800; 379/93, 95, 96, 101, 102, 105, 110, 112

[56] References Cited

U.S. PATENT DOCUMENTS

| | | | |
|---|---|---|---|
| 4,091,448 | 5/1978 | Clausing | 235/379 |
| 4,186,438 | 1/1980 | Benson et al. | 395/600 |
| 4,425,627 | 1/1984 | Eibner | 395/156 |
| 4,481,574 | 11/1984 | De Fino et al. | 379/93 |
| 4,493,021 | 1/1985 | Agrawal et al. | 395/200 |
| 4,494,194 | 1/1985 | Harris et al. | 395/275 |
| 4,503,288 | 3/1985 | Kessler | 379/67 |
| 4,604,686 | 8/1986 | Reiter et al. | 395/500 |
| 4,688,170 | 8/1987 | Waite et al. | 395/500 |
| 4,724,521 | 2/1988 | Carron et al. | 395/700 |
| 4,727,243 | 2/1988 | Savar | 235/379 |
| 4,788,657 | 11/1988 | Douglas et al. | 395/325 |
| 4,839,919 | 6/1989 | Borges et al. | 379/96 |
| 4,851,994 | 7/1989 | Toda et al. | 395/275 |
| 4,858,114 | 8/1989 | Heath et al. | 395/775 |
| 4,935,870 | 6/1990 | Burk, Jr. et al. | 395/275 |
| 4,956,852 | 9/1990 | Hodge | 375/8 |
| 4,995,074 | 2/1991 | Goldman et al. | 379/97 |

FOREIGN PATENT DOCUMENTS

| | | |
|---|---|---|
| 0014313 | 8/1980 | European Pat. Off. . |
| 0181438 | 5/1986 | European Pat. Off. . |
| 3423090 | 6/1984 | Fed. Rep. of Germany . |
| 3405448 | 11/1987 | Fed. Rep. of Germany . |
| 2309915 | 4/1975 | France . |
| 1324616 | 7/1973 | United Kingdom . |

OTHER PUBLICATIONS

Fike et al., Understanding Telephone Electronics, 1989, Howard W. Sams & Company, pp. 119-150.
Megatel Computer Corporation, V-40-Based Single-Board Computer Technical Manual, 1989.
PCT Application No. PCT/US87/01560 filed Jul. 7, 1987; European Patent Application No. 85109734.5 filed Feb. 8, 1985; European Patent Specification Publication No. 0014313, filed Jan. 1, 1980.
PCT Application No. PCT/BR86/00015, International Filing Date: Aug. 15, 1986.
The Xilinx "Programmable Gate Array Data Book" (1988) pp. 6-38 to 6-40.

*Primary Examiner*—Robert B. Harrell
*Attorney, Agent, or Firm*—Mason, Fenwick & Lawrence

[57] ABSTRACT

An improved user terminal specifically designed for use in the home for accessing a wide variety of service computers is disclosed. The terminal comprises a single board computer including a microprocessor remotely reconfigurable programmable gate array logic, several types of solid-state memory, and various input-output units. The programmable gate array forms the logical connection between the microprocessor, the memory, and the input-output elements, and allows the computer to functionally mimic an IBM Personal Computer, thus allowing it to run a wide variety of software. The programmable gate array can be remotely reconfigured, and a so-called FLASH-EPROM memory is used to store reconfiguration code. This allows the hardware to be reconfigured remotely in order to add additionally function, or to cure a particular problem such as to prevent a "virus" or the like from attacking the system.

19 Claims, 2 Drawing Sheets

DISTRIBUTED-INTELLIGENCE COMPUTER SYSTEM INCLUDING REMOTELY RECONFIGURABLE, TELEPHONE-TYPE USER TERMINAL

CROSS-REFERENCES TO RELATED APPLICATIONS

This application is a continuation of U.S. patent application Ser. No. 07/439,739, now abandoned, filed Nov. 21, 1989, is a continuation-in-part of the following U.S. Patents and co-pending U.S. patent application: Ser. No. 07/190,440, filed May 5, 1988 and issued as U.S. Pat. No. 4,991,199 on Feb. 5, 1991; Ser. No. 07/260,832 filed Oct. 21, 1988 and issued as U.S. Pat. No. 5,009,927 on Apr. 16, 1991.

FIELD OF THE INVENTION

This invention relates to a remotely-reconfigurable user terminal designed for use in connection with a distributed data processing system. More particularly, this invention relates to a user terminal intended for use at the home of a bank customer to allow the customer access to the bank's database and software, as well as to access other remote data bases and the like. In the preferred embodiment, the invention is useful for encouraging customers of electronically-managed services such as banking to carry out transactions using terminals in their homes.

BACKGROUND OF THE INVENTION

It will be appreciated that in recent years banking customers have increasingly become accustomed to using automatic teller machines (ATMs). These have been relatively successful because they provide a simple and clear "menu" of choices to the consumer at each step of each transaction, such that the customer is very readily led through the sequence of inputs required by the system to respond to the customer's request. It would be desirable if such functions could also be carried out by the consumer in the privacy of his own home, thus rendering the service more convenient and thus more likely to be commonly used.

Presently, the most widely used personal computers are manufactured by IBM Corporation (the "IBM PC" or "PC") or so called "clones" thereof. The software for the PC's is currently so widely used that it is advisable for the home computer, employed for accessing computerized services, such as banking, to be compatible with the PC's.

To date, substantially all PC's have been configured to comprise a keyboard of between 60 and 101 keys, a display device, and a housing containing the circuit boards of the computer including various interfaces to other devices such as modems for communication, printers and the like. Such PC's, while increasingly popular, still intimidate many potential users. Accordingly, it is an object of the present invention to provide a computer which conforms to the functionality of the PC—that is, for example, which runs software developed for banking applications so that it can interface with banking computers, exactly as if it were in fact a conventional PC—while providing a user-friendly, simplified and nonthreatening appearance. In particular, it is desired to place a computer having PC functionality within a package physically resembling an essentially conventional telephone.

Copending Application Ser. No. 260,832 filed Oct. 21, 1988 discloses generally a telephone-resembling device which performs computer functions as well as conventional telephone functions, while presenting a user-friendly appearance. That application Ser. No. 07/260,832, is incorporated by reference herein, and the present invention is related to the invention described in Ser. No. 260,832.

It will be apparent to those of skill in the art that the provision of 37 PC functionality", that is, the ability to run conventional PC software programs without modification to the software, places very substantial constraints on the design of a computer which is to fit within a housing conforming in size and shape to that of conventional telephone. For example, substantially all PC programs are designed to be stored on "floppy disks", or are initially supplied on floppy disks and later copied to a "hard disk". Both of these memory devices require more space than is available in the housing of a conventional telephone. Similarly, the circuit boards used conventionally in PCs are much too large to fit within a conventional telephone, as are the keyboards which are conventionally used. Accordingly, it is not possibly to simply shoehorn the normal PC components into a housing resembling a conventional telephone. Moreover, it is desirable in any event to eliminate the use of removable floppy disks and the like from the device provided according to the invention, to simplify its operation and to render it even more user-friendly, and thus accessible to a wider class of possible users.

various firms, including AT&T and Sears, Roebuck & Co., have provided home banking services employing home terminals which communicate with bank service computers. These have either involved "dumb terminals", i.e., terminal devices having no intelligence, or conventional PC's. Nether system is fully user-friendly, since both require some computer literacy on the part of the user.

It will also be appreciated that if a home terminal is to provide access to a banking computer to perform financial transactions, a very high degree of security must be built into the system, such that the user cannot corrupt his own or other accounts, cannot withdraw assets from other accounts, and most importantly cannot cause a system error of a type which would cause the entire bank computer system to cease operations, however briefly. To do so means that the home terminal must interact with the network in a sophisticated way. It is also highly desirable that the interaction of terminal and host be amenable to convenient alteration at a later time if it should become necessary.

For example, there have recently been widely publicized instances of "software viruses" which permeate computer networks. The chaos caused in a banking system susceptible to such a virus can hardly be imagined. The prior art teaches no system which provides anything It is therefore very important that the home computer be updatable, remotely from the host, with respect to hardware and software changes necessary to eliminate such bugs or viruses, and to introduce new security features, such as data encryption. remotely resembling this set of features in a terminal intended for home use for accessing a banking system.

It is another object of the invention to provide a user home terminal which is suitable for banking functions as indicated above and which would additionally be useful in accessing other sort of data bases which support, for example making airline reservations, obtaining stock quotes, accessing news tickers, accessing directory "white" and "yellow pages", and the like. Again, while various computer systems are available essentially for home use for providing these functions, in substantially all cases these are conventional personal computers which still intimidate a large fraction of the potential user market. Accordingly it is an object of the invention to provide these functions as well in a user-friendly, non-intimidating compact terminal generally resembling a telephone.

Megatel Computer (1986) Corporation, of Weston, Ontario, Canada, with which at least one of the inventors named herein is affiliated, has been selling for more than a year prior to the filing date of this application a single board computer which is capable of emulating an IBM Personal Computer and running conventional software programs intended for use with conventional IBM PCs. This Megatel computer has on its single circuit board a microprocessor, typically a Nippon Electric Corporation (NEC) model V25 or V40, a programmable gate array chip sold by Xilinx Corporation under Model No. XC2018 or the equivalent, both random access memory (RAM) and read-only memory (ROM) and various input-output devices as well as associated connectors and the like. Briefly stated, the use of the programmable gate array to connect the microprocessor to the memory and to the input-output devices has provided this computer with unparalleled flexibility in emulation of the basic functions of an IBM PC, such that it is capable of running substantially all conventional software programs for the IBM PC. This is true even though in many applications the Megatel computer is not connected to external magnetic storage media, printers and the like, and even though the software normally would only run on computers thus configured. To fully understand the significance of this fact, a brief discussion of the IBM PC marketplace is in order.

As a rule, conventional software programs are stated to be "PC-compatible" when they are intended to be run on the IBM Personal Computer (PC). However, not all "PC-compatible" programs will run on all PC's. That is, for example, one program may require a so-called "hard disk" having 40 megabytes storage capacity. Another may require one megabyte of RAM. A third may require an optical disk; a fourth a "VGA adapter card", and a fifth, two floppy disks. Thus, "PC-compatibility" only implies with respect to a particular software program that a PC can be configured with appropriate devices and peripherals on which the software will then run; it does not mean that all "PC-compatible" software will run on the same PC.

The basic hardware components of the PC itself, as distinguished from its peripherals, include a microprocessor, a certain amount of read-only and random-access memory ("ROM" and "RAM" respectively), and circuit elements providing logical connection between these various basic components as well as to the keyboard and the display, and to any peripherals such as modems, printers, external memory and the like. The peripherals are normally connected directly to various dedicated "driver" and "interface" chips, which are in turn connected by logic circuit elements to the microprocessor, RAM and ROM. Thus, all PC's require some sort of hardware, i.e., discrete circuit elements, to provide appropriate logical connections to functionally "glue" the microprocessor, RAM, ROM, and the various dedicated input/output devices and peripheral drivers together.

Certain software, referred to as the "BIOS", for Basic Input/Output System, is also essential to provide the "PC architecture". The BIOS provides the interface between the usual PC-compatible software programs (which are also referred to the art as "DOS-compatible", which means that they are designed to work with IBM's Disk Operating System, or DOS; DOS is thus only useful if the BIOS and BIOS-compatible hardware are already in place) and the actual hardware elements. The hardware elements, plus the BIOS, thus form the basic "PC architecture".

In the IBM PC itself, a custom designed "gate array" chip is normally used to provide the logical connection between the microprocessor, the RAM and ROM, and the various dedicated input/output and peripheral driver elements. Various others have provided these functions using so-called programmable array logic (PAL) chips. Such PALs comprise a number of predefined but not preconnected logic gates on a chip. Connections are established by fusing fusible links disposed on the chip. Having thus been programmed, the PAL circuitry cannot be further altered.

Megatel has been selling for more than one year prior to the filing date of this application a single-board computer in which the function of logically connecting the microprocessor to the memory, input/output and other devices is provided by a programmable gate array (PGA) chip, also sometimes referred as a logic cell array (LCA) chip, made by Xilinx, Inc. of San Jose, Calif. and second sourced by other firms. The BIOS used by Megatel in this computer is also commercially available. The "glue" required to functionally connect the microprocessor, the memory, and the input-output chips is provided by configuring the PGA chip by supply of a series of signals, referred to by Xilinx as "configuration programs" and sometimes herein as "configuration code" or "configuration software". Essentially, this configuration code defines the logical connection of various basic logic elements on the PGA chip.

The Xilinx "Programmable Gate Array Data Book" (1988) discusses at pages 6-38 to 6-40 use of this technology for "self-Diagnosing Hardware", suggesting that the device "... can perform diagnostic functions at power-up, or in test modes, and perform normal functions where the board is determined to be operational." It is specifically suggested that this will be particularly useful for testing peripheral control logic using loopback techniques, I/O and memory error detection circuitry, and interrupt techniques. It is an object of this invention to fully utilize these capabilities of the programmable gate array chip to provide very powerful test and configuration capabilities for the terminal of the invention.

SUMMARY OF THE INVENTION

In the preferred embodiment the objects of this invention are accomplished by introducing a novel computer architecture of a user terminal employed in a distributed computer network that includes one or more service computers for providing computerized services to consumers who may use the terminals of the present invention in their homes. The network also includes at least one network host computer that provides an interface between the service computers and the terminals of this invention.

The terminal of this invention includes reprogrammable logic means which comprises a programmable gate array (PGA) which is responsible for implementing logical interconnections between the functional components of the terminal. The logic means and thus the logical interconnections of the terminal can be reconfigured by supplying a new configuration code (the "reconfiguration code") to the terminal. (In general, the terminology "configuration" and "reconfiguration" code can be used interchangeably). This reconfiguration code can be supplied from a remote source, which in the preferred embodiment, is the network host. The network host of the preferred embodiment also stores application software that can be downloaded to the user terminal of the present invention so as to enable a user to interact with a selected service (i.e. the application software provides an appropriate user interface for the selected service).

More specifically, the terminal of the preferred embodiment comprises a processor, a first memory for storing the reconfiguration code for the programmable gate array received from the network host; a second memory for storing application programs some of which are downloaded from the network host, and a third memory for storing system initialization software which functions include initial configuration of the programmable gate array.

The method of the preferred embodiment includes downloading application software to the terminal to provide a user interface for the desired service; and downloading reconfiguration code to the terminal if it is necessary to reconfigure the programmable gate array in order to update the logical connections of the terminal.

The present invention permits the implementation of a terminal which provides or simulates the complete PC capabilities, while fitting within the configures of a housing of familiar and nonthreatening appearance, preferably conforming in size and appearance to that of a conventional telephone. Also, conventional telephone functions are supported by the user terminal of the preferred embodiment of the invention.

As indicated, the PGA (programmable gate array), which implements logical interconnections between the components of the terminal, such as the processor, memory and input and output devices, can be reconfigured by supplying a new configuration code to the terminal Thus, for example, if a particular hardware change needs to be made to accommodate a particular software program, this can be done readily by simply supplying reconfiguration code appropriately to the PGA chip and reconfiguring it before the software is to be run. Similarly, use of the PGA chip in many cases will allow reconfiguration of the hardware to support new peripherals - e.g., an enhanced-resolution display, an optical disk storage device, so-called "smart" or debit-card readers, or the like, which in other systems would normally require the physical addition of a new circuit board or the like.

Use of the PGA chip has extremely powerful and extensive implications. For example, a piece of software running on a IBM PC operates properly when it "recieves" an appropriate sequence of signals from the microprocessor in response to the signals it "generates". For example, a microprocessor may be directed by software to send a certain data item to a floppy disk for storage. The floppy disk controller responds to such a request with a predetermined acknowledgement signal; when this signal is received by the software, it then performs a subsequent function. Accordingly, if the PGA chip is configured to respond to a particular signal provided by the software with the proper acknowledgement signal, the software can be "fooled" into thinking the PC is configured with certain peripherals when in fact none is provided. Thus, to provide "software-compatibility" the PGA chip need simply be configured to respond to a known sequence of signals with a corresponding sequence of response signals, thus fooling the software into thinking it is running on a properly configured PC.

As mentioned above, Megatel has been using the programmable gate array technology to emulate IBM PCs per se for more than year prior to the filing of this application. However, so far as the inventors are aware, there has to date been no application of this PGA technology to the specific problem of providing a home user terminal for accessing a bank system as well as other computer systems, all as discussed above. Nor (again, so far as the inventors are aware) has there been any, use of this PGA technology to physically emulate a telephone while providing various functions of a typical personal computer. Moreover, again to the best of the inventors' knowledge, there has been no implementation of a home computer in which some portion of the hardware is defined by configuration code supplied to a programmable gate array, much less one which can be remotely reconfigured, e.g. so as to cure a "hardware virus", to provide an updated user function, to provide an improved security function such as data encryption, or otherwise to reconfigure the logic of a terminal once installed in the user's home.

According to a particularly preferred embodiment of the invention, the reconfiguration code is stored in a FLASH-EPROM, a read-only memory which is erasable in response to a signal received from a remote location. This allows the PGA chip in a computer installed in a user's home to be reconfigured essentially at will, without the requirement of a service call or the like, at high speed and at low expense.

BRIEF DESCRIPTION OF THE DRAWINGS

The invention will be better understood if reference is made to the accompanying drawings, in which.

DESCRIPTION OF THE PREFERRED EMBODIMENTS

As mentioned above, a principal object of the invention is to provide a user-friendly terminal suitable for accessing a bank computer system operating various bank software programs, involving individual checking accounts and the like, and additionally providing a user-friendly method of accessing other service computers, such as those which provide airline reservation functions, stock table look-up functions, electronic bulletin board services, and a vast panoply of other such services, and which can also operate as a conventional telephone. It will be appreciated by those of skill in the art that typically in order to access such a diverse variety of services one must have educated oneself in an equal variety of user interfaces which can be quite complex. For example, simply to keep track of the various user codes and access steps required to access each of these services is a substantial undertaking.

According to the invention more particularly described in copending application Ser. No 07/433,725 fiied Nov. 9, 1989 (Attorney's docket No. 5013-021) now abandoned incorporated herein by reference, this capability is provided in accordance with FIG. 1. Essentially, each user is provided with a user-friendly terminal 2 which resembles a conventional telephone, including a display 2a and limited format keypad 2b, or may alternatively employ a conventional personal computer as indicated generally at 10. According to the invention describes in Ser. No. 07/433,825, filed Nov. 9, 1989, and now abandoned, both terminals are connected by conventional telephone lines indicated generally at 3 to a network host computer 8. The network host computer includes a session controller 6, which may comprise hardware and software and which includes various functional elements 4, 12, 14, and 16, as described more fully in Ser. No. 07/433,825, filed Nov. 9, 1989, now abandoned. One essential function of the network host computer 8 is to provide a series of application program "pages" which are downloaded to the home terminal 2 or 10 and which provide it with sufficient information that it can supply the user with sufficient "prompts" to elicit from the user whatever information—user codes, desired transactions, and the like—is required to access one of a plurality of service computers 20a–d to which the network host computer 8 is connected, also by conventional telephone lines.

Figure 1:
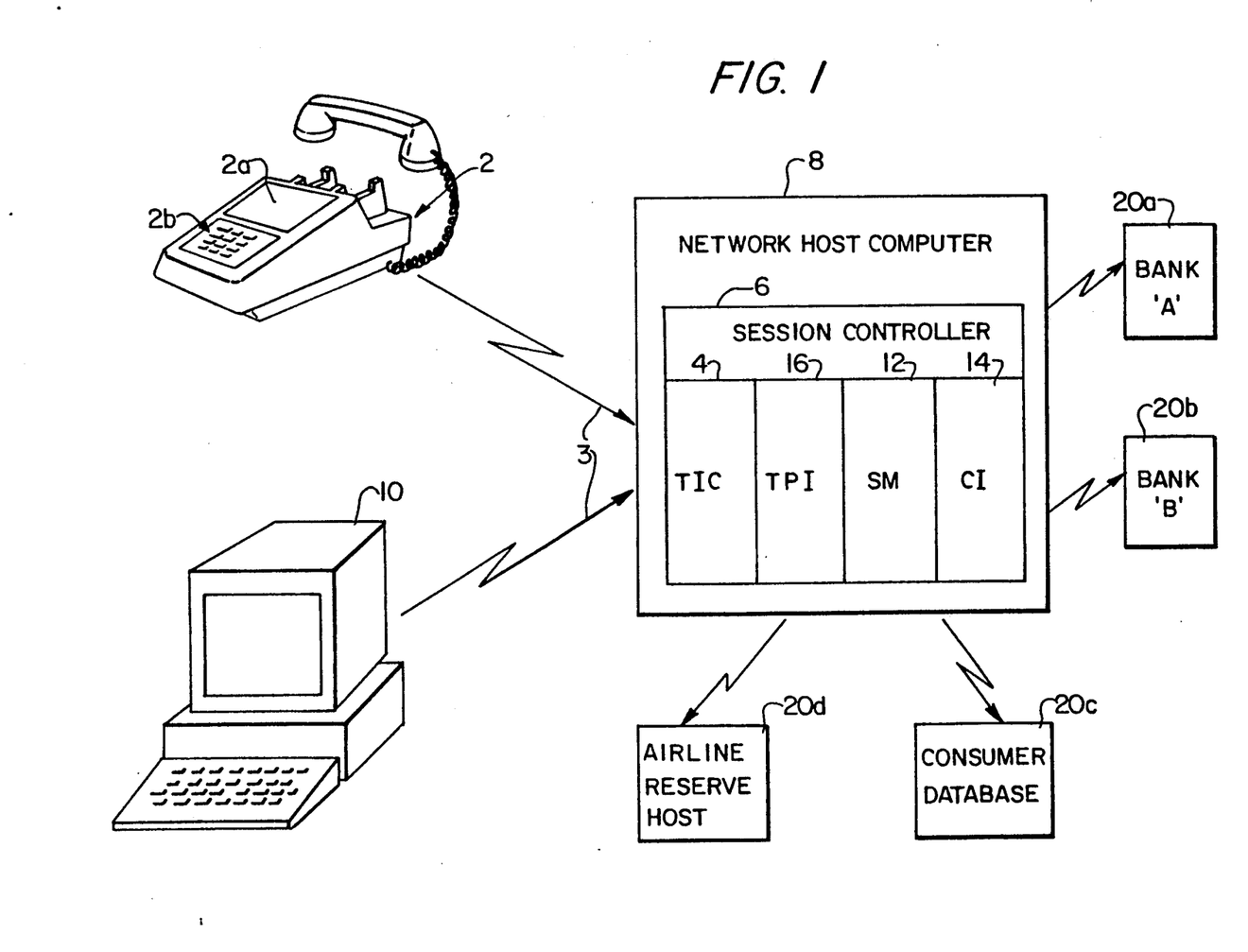
FIG. 1 shows a overall view of the terminal according to the invention in a distributed data processing system.

More particularly, suppose the user desires to access the service computer 20a of a particular bank A. When he activates his home terminal 2, there will appear on a display screen 2a a menu allowing him to select "Access Bank Services" by pressing, for example, the "3" button on the keypad 2b. If he does so,.the terminal 2 will send a message to the network host computer 8. The host computer will in turn consult its internal memory to locate the application program required to access the service computer 20a of bank A and will download this to the home terminal 2. The home terminal will in turn operate using this program and will ask the user various questions required to prompt the user to input the information needed to access his account at the bank—for example, his account number, his secret access code, the type of transaction desired, the amount of deposit, withdrawal, or transfer required, and so on. In other words, such a program provides a user interface for a particular application. This information is then transferred from the home terminal 2 to the network host computer 8 in a message having a first protocol; see Ser. No. 07/433,825, filed Nov. 9, 1989, referred to above. The network host computer transforms this information into whatever second protocol is conventionally required to communicate with the service computer 20a, for example, in the precise manner according to which automatic teller machines communicate with it. If on the other hand the consumer desired to access Bank B, typically the consumer will be asked the same questions by way of prompts, but the network host computer will transform the answers into a somewhat different protocol required to access the service computer 20b of Bank B.

In a similar manner, if the consumer desires to access an airline reservation host computer 20d, a somewhat different sequence of prompts would be provided by the home terminal 2, operating using an appropriate different "page" of application program software downloaded by the network host computer 8; a similarly different communication sequence would occur between the network host computer 8 and the airline reservation host computer 20d. The communication sequence and in particular the detailed format of the messages back and forth between the terminal 2 and the network host 8 are discussed in detail in Ser. No. 07/439,825, filed Nov. 9, 1989 referred to above and incorporated by reference herein. Communication between the network host 8 and the various service computers 20a–d takes place according to various second protocols defined by the proprietors of the services supported by the service computers; implementation of these communications follows the techniques now in use with such preexisting service computers and is considered to be well within the skill of the art. As described above, it is desirable that the terminal 2 be capable of running PC compatible programs. A conventional.personal computer 10 can also be used according to the invention to 25, communicate with the various service computers 20a–d by way of the network host computer 8. Again, "pages" of application software can be downloaded from the network host 8 to the conventional PC 10 in response to the user's selection of a particular service computer 20a–d. This will enable the home terminal to "prompt" the user 2 to input whatever data is required to access the appropriate service computer.

As discussed above, according to the invention a home terminal 2 is provided in a form physically resembling a standard telephone, and providing PC functions, while requiring no additional disk drives, printers or other peripherals, and in particular to do so while avoiding provision of elaborate keyboards as conventionally required by the prior art computers running PC-compatible software. However, embodiments of the home terminal 2 which do include full alphanumeric keyboards are within the scope of the invention. Similarly, conventional PC peripherals can be connected to the computer provided by the terminal of the invention. This facility is of particular use when previously unsophisticated computer users desire to add new capabilities to the terminal provided according to the invention, e.g., as they become more knowledgeable. However, in order to achieve the basic user-friendly nonthreatening appearance of the terminal of the invention, it is essential that the computer fitting within the physical housing of the conventional telephone 2 be able to mimic a PC configured in accordance with the requirements of a wide variety of software, particularly with respect to the response of conventional disk drives and the like to PC-compatible software.

As discussed above, Megatel Computer (1986) Corporation has been selling single board computers which conform to the PC architecture, and which employ programmable gate arrays as discussed above, for more than one year. However, the Megatel computer has not prior to the present invention been used to provide conventional telephone functions as disclosed herein and in the related applications discussed above. In particular, it is important to achieving several of the objects of the invention that the programmable gate array be remotely reconfigurable by supply of reconfiguration code from a network host computer 8, in order to avoid "software viruses" by altering banking security arrangements, for example by adding data encryption facilities for making communications more secure, and the like. In this way additional terminal functions can also be remotely added to the telephone-resembling terminal 2 after its installation in a user's home. This has not been done prior to the present invention by Megatel or otherwise so far as the present inventors are aware.

Figure 2:
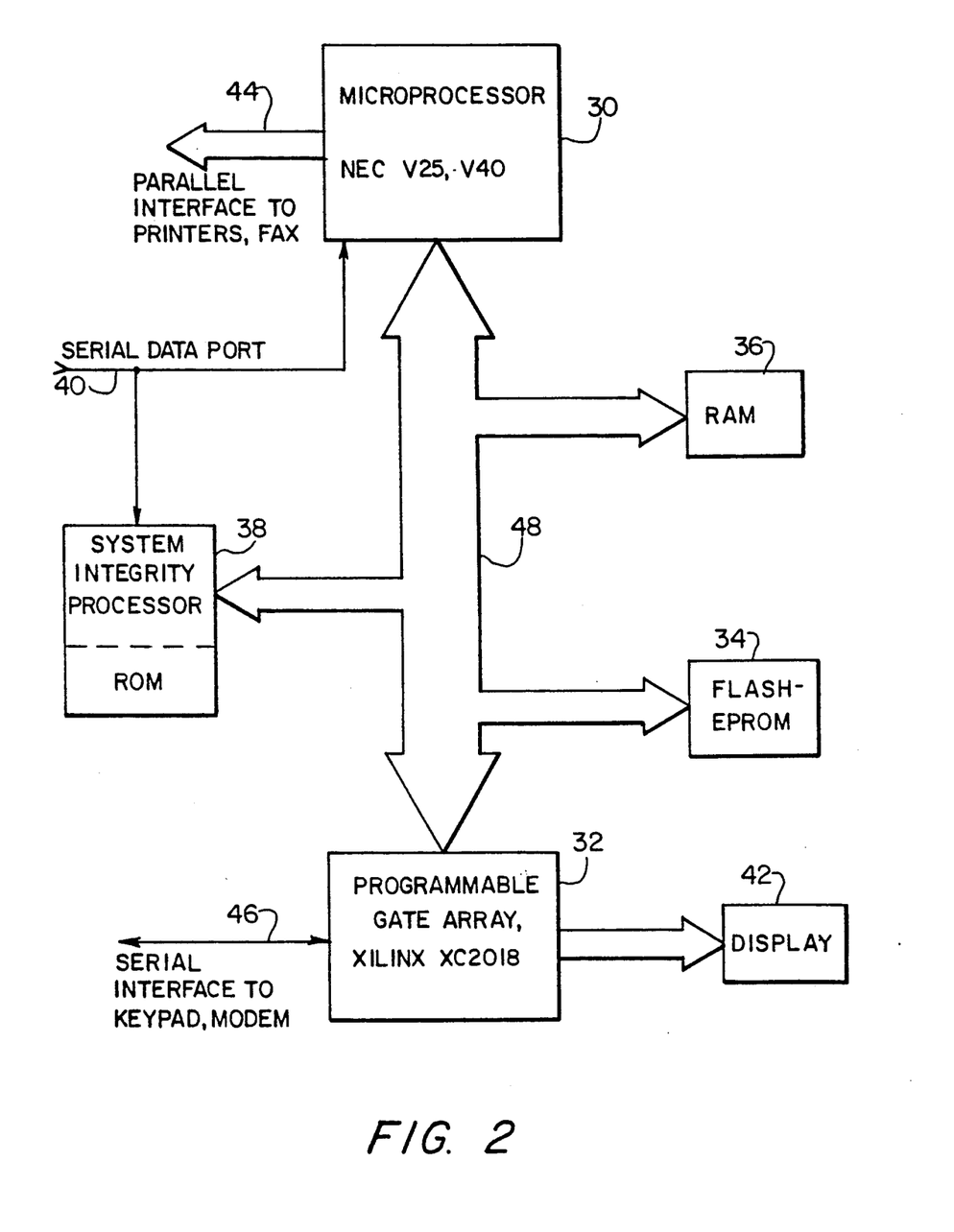
FIG. 2 shows in block diagram form the principal components of the system of the invention.

FIG. 2 shows in block diagram form the principal elements of the remotely-reconfigurable computer system comprised by the user terminal 2. A microprocessor 30 which may comprise a Nippon Electric Corporation (NEC) Model V25 or V40 or the equivalent is connected to a programmable gate array 32 which as indicated above will typically be the model XC2018 of Xilinx Corporation of San Jose, Calif. The programmable gate array 32 comprises a number of logic gates which are configurable by configuration code supplied from a read-only memory (ROM) or elsewhere take to take on certain specific functions. Thus by supplying new configuration code, "reconfiguration code", these functions are redefinable at will. In the present case, the reconfiguration code necessary to program the gate array so that the system can carry out its assigned functions, which code is termed the "operational reconfiguration code", is stored in a reprogrammable read-only memory 34. Particularly, this read-only memory 34 is so-called "FLASH-EPROM", which is rewritable in response to a signal received from a remote location. The advantage of this will be apparent to those of skill in the art: if it is desired to reconfigure the programmable gate array, for example, to cure a software bug or eliminate a virus, this can be done remotely simply by supplying new configuration code to the FLASH-EPROM 34. 256 kilobytes of FLASH-EPROM will normally be sufficient.

For example, in the banking terminal application, suppose that a computer virus is attacking the microprocessors 30 of the user terminals. Any such virus will have to conform to the microcode used to run the microprocessor. According to the invention, some of the functions of the gates internal to the programmable gate array 32 can simply be reversed, and a corresponding change made to all software downloaded to the terminal to enable it to access the various service computers. The virus, not having the benefit of the change, will cease to operate and thus cease to interfere with the operation of the terminal. Similarly, if communication between the service terminals and the service computers tends to be corrupted or tapped, data encryption can be provided by reconfiguring some portion of the code stored in the FLASH-EPROM and thus reconfiguring the gates of the programmable gate array.

The microprocessor 30 and the programmable gate array 32 are connected as well to a main memory 36 which comprises random access memory (RAM) as is conventional in the art. Up to 2 megabytes of memory are typically provided. The random access memory 36 will normally be used to store application programs downloaded from a remote host, but also stores reconfiguration code when first received, prior to its being copied into the FLASH-EPROM.

A communication path to the network host computer 8 (FIG. 1) is provided via a serial data port indicated generally at 40. In one embodiment of the invention, port 40 is also connected to a system integrity chip 38 typically comprising a single chip Model 16C54 computer sold by the Microchip Corporation. This chip has the capability of both storing ana executing code. Certain "kernel" code required to initially program the programmable gate array chip 32 is permanently stored in non-volatile, non-rewriteable ROM comprised by the system integrity chip 38 at manufacture. Thus, in response to a simple reset signal received from the outside port 40, the system integrity chip is capable of copying this kernel code to the programmable gate array chip 32. Typically the PGA chip 32 will first exercise the microprocessor 30 and verify circuit connections. Thereafter, the configuration code can be downloaded via the same port 40 or another port, stored in the random access memory 36, copied to the FLASH-EPROM 34, and used to reconfigure the programmable gate array 32.

More particularly, suppose that through error the entire system has been deprogrammed, or alternatively suppose that the terminal is being manufactured and has never been programmed. In either case, the ROM of the system integrity processor 38 will have stored therein the basic "kernel" or "system initialization software" required to allow configuration of the programmable gate array device. The system integrity chip, which may also be termed a "test processor", initially configures a portion of the programmable gate array device to perform a "serial scan test" which will verify the physical circuit connections of the chip. This is particularly useful because the programmable gate array chip 32 will typically be physically connected to substantially all signal paths on the circuit board, so that this test is in fact substantially complete.

The system integrity processor 38, having completed this test, then causes a first group of "system verification software" to be downloaded either from an external processor, such as the host network computer, or from a technician's test device, to reconfigure a portion of the programmable gate array to resemble read-only memory containing certain predetermined microcode. This microcode is then used by the microprocessor 30 to test its own functions, which typically will include testing of the random access and read-only memory devices.

At this point, the microprocessor 30 can take over operations, and causes further reconfiguration code, the "operational reconfiguration code" (according to which the programmable gate array chip 32 is configured to perform its ultimately desired functions) to be downloaded. This is stored first in the random access memory 36, then copied to the read-only memory 34 and is then used to reconfigure the programmable gate array device 32 into its operational configuration, thus completing initial loading or test of the terminal device of the invention.

In the preferred embodiment, the "operational reconfiguration code" is stored in duplicate in the FLASH-EPROM. This allows the two copies to be compared to one another, providing an additional check on system integrity.

As discussed above, one of the principal functions of the programmable gate array 32, which is comparable to the functions performed by custom chips in IBM PCs and by programmable array logic (PAL) chips in other PC-compatibles, is to interface the microprocessor 30 to a display 42, which may one of a variety of different units. In the telephone-resembling terminal 2 of FIG. 1, the preferred display unit 2a is currently a flat panel liquid crystal display (LCD). However, the programmable gate array can also be readily reprogrammed to drive other sorts of displays such as conventional EGA or CGA monitors, plasma displays or the like. In some case it may be desired to employ a further additional display driver chip, which itself provides certain display driver modification possibilities. Again, the reconfigurability of the programmable gate array allows very substantial flexibility in use of the device according to the invention.

As indicated generally at 44, the microprocessor 30 is connected to certain of the input-output chips directly; typically, these may include parallel interfaces such as printer ports and interfaces for digital facsimile equipment. By comparison, the programmable gate array is typically connected to other input-output devices 46 which are serially connected, such as conventional or limited-format keyboards, or a modem.

Those of skill in the art will understand that the diagram in FIG. 2 is intended to be a functional depiction, and that in fact various principal components thereof such as the microprocessor 30, the programmable gate array 32, the RAM 36 and the FLASH-EPROM 34 may all be connected by a conventional data bus 48. It is also within the skill of the art to replace the FLASH-EPROM with other memory capable of performing the same functions, such as for example that described as a "silicon file" or as "battery-backed nonvolatile readable and writable memory". Of course, in other circumstances conventional random-access memory can perform some of the functions described above for the FLASH-EPROM 34 as well; again, the key function is that it be capable of receiving and storing reconfiguration code preferably received over a telephone line or the like via a conventional port, so as to enable reconfiguration of the programmable gate array 32 as needed to update the hardware configuration of the system.

In the preferred embodiment of the invention as employed in the telephone-resembling user terminal 2, four distinct levels of software are provided, having different access capabilities, different storage requirements, and different uses as indicated below.

The highest "level" of software in the telephone-emulating version of the system, is referred to as the "home application language" or "HAL" software. The HAL software is downloaded in "pages" from a network host computer in response to the user's indication that a particular service is to be accessed. If the user indicates that he wants to determine his checking account balance, typically by pressing a single button on the terminal 2 in response to a prompt, the terminal 2 sends an appropriate message to the network host 8, after which the network host 8 downloads the appropriate page of HAL software necessary to prompt the user to input his user code and the like. The HAL software when received by the terminal is stored in random access memory (RAM) 36 and normally is run immediately. Certain commonly used pages of HAL application software may also be stored by the terminal, typically in FLASH-EPROM 34, in order to reduce the number of communications required to access the network host where this would appear useful. It is envisioned that on the order of 3-10 pages of HAL software might be typically downloaded to a terminal per day. The HAL software thus provides the information necessary to provide the desired user-friendly user interface, and is downloaded in response to the user's specific request. This process is detailed fully in copending Ser. No. 07/433,825 filed Nov. 9, 1989 The HAL software is thus functionally comparable to IBM's Disk Operating System (DOS) software.

The next level of software stored in the terminal is the so-called basic input-output system or "BIOS". As is conventional in IBM PC terminology, BIOS software supports various functions shared by various pages of HAL software such as display control, preparation of messages to the network host, support of keyboard functions, and the like. According to the invention, updated "multi-application" BIOS software can be downloaded from the network host when needed, a process which might take place on the order of several times per year. Updated BIOS software will initially be received in RAM and will then be copied to FLASH-EPROM for long term storage. It will be appreciated by those of skill in the art that the BIOS software provides functions which are employed by the HAL software and is thus essential in order that the HAL software can run properly.

The next lower level of software is the reconfiguration software or code which defines the state of the programmable gate array (PGA). This is also referred to as "PGA code" or "configuration code". Functions provided by the PGA chip programmed in accordance with the PGA code include functions which must be performed at high speed, such as memory control and timing, and parity checking with respect to various data communication paths, as well as providing the logic connecting the microprocessor to the RAM, ROM and input/output devices.

As in the case of the BIOS software, any update to this reconfiguration code downloaded from the network host is initially stored in the random access memory and then is copied to the FLASH-EPROM and used to reconfigure the PGA chip as need be. For example, if it appears that a software virus is active, the hardware can readily be reconfigured such that the virus could no longer run on the terminal. This would of course necessitate that other software including the BIOS and possibly the HAL software be at least partially rewritten. However, these tasks can also be accomplished remotely.

The advantage of this facility is clear; for further examples, the PGA code could also be altered remotely if it were desired to add additional functions to the terminal of the invention, such as adding a facsimile capability, a smart card interface, magnetic or optical memory elements, or the like. In some cases it might also be necessary to reconfigure the PGA code to cure a flaw in the hardware design detected some time later. Again, each of these options substantially increases the utility of the terminal.

As indicated above, the PGA code, having reconfigured the PGA chip, thus provides the foundation on which the BIOS software operates; accordingly, the PGA chip must be configured properly for the various input-output functions controlled by BIOS to operate properly.

The final and lowest level of software is referred to as a "kernel". This software is permanently written to nonvolatile read only memory comprised by the system integrity chip 38 or possibly by a separate ROM. It is this kernel which operates the system to the extent required to allow the reconfiguration software to be downloaded to the terminal in order to initially program the PGA chip as indicated above. It is not possible to alter the kernel after manufacture of the system. Again, this software is essential in order that the PGA can be reconfigured by supply of reconfiguration code.

It will have been appreciated that the above described software structure provides partitioning of the various elements of software according to their functions and their frequency and ease of access. The higher level software will be more frequently accessed. Similarly, the higher levels are variable in response to a user request (in the case of the HAL application) or relatively readily by the operator of the network host (in the case of the BIOS software). Access to the PGA reconfiguration software will be restricted to the manufacturers or to a relatively small group of the system operators in order to ensure that this highly significant software is not tampered with. As noted the kernel software is not alterable.

As indicated above, an extremely important object of the present invention is to allow the user to access a bank data base. Clearly in order to avoid compromising the integrity of the data base, and to restrain fraudulent transactions or the like, the system must be made highly reliable. The capability of reconfiguring the actual logic of the terminal according to the invention substantially enhances this security. In this way, a hardware change can be made at any time to support a change in the software desired, for example, to alter access requirements to prevent fraudulent users or to forbid them to access the data base. Those of skill in the art will immediately recognize a number of specific changes which can be made to prevent preexisting software from running on the terminal. For example, data encryption could be made essential to all terminal-tone-work host communications. Regular changes, e.g., once per month, could be instituted to prevent any "hacker" from obtaining access, for example, simply by regularly changing the encryption method used.

It will be appreciated by those of skill in the art that while one embodiment of the invention has been disclosed, further modifications and improvements could be made thereto without departure from the spirit and scope of the present invention. Therefore, the invention is not to be limited by the above exemplary disclosure, but only by the following claims.

We claim:

1. A distributed-intelligence computer system comprising:
   a plurality of service computers, each of said service computers supporting at least one particular consumer service, at least one network host computer, and at least one user terminal, wherein:
   said at least one network host computer comprises:
   a) first communications means for communicating with said at least one user terminal in accordance with a user terminal protocol;
   b) second communication means for communicating with said plurality of service computers in accordance with a plurality of service computer communication protocols;
   c) data-conversion means for converting data received from said at least one user terminal in accordance with the user terminal protocol into an appropriate service computer communication protocol;
   d) network memory means for storing application programs, the application programs including instructions to enable said at least one user terminal to prompt a user to input data required by a particular service supported by one of the service computers, and instructions to enable said at least one user terminal to prompt the user to input further data in response to data provided in response to a prior prompt;
   e) first downloading means for downloading application programs stored in said network memory means to said at least one user terminal; and
   f) second downloading means for downloading configuration code to said at least one user terminal; and
   said at least one user terminal comprises a telephone including:
   a) a limited format input device, said input device including a conventional telephone keypad;
   b) a receiver capable of receiving and transmitting audio and digital information
   c) display means for displaying prompts in response to instructions from the application programs stored in said network memory means and for displaying responses to the prompts which are supported by said input device;
   d) terminal memory means for receiving and storing an application program downloaded by said network host computer from said network storage means;
   e) microprocessor means for executing said stored application program for providing prompts to the user for display on said display means in accordance with the user terminal protocol;
   f) a programmable gate array remotely reconfigurable in response to configuration code downloaded from said at least one network host computer for interfacing said microprocessor means with said display means, to make said terminal compatible with a service computer selected for access by the user.

2. The system of claim 1, wherein said programmable gate array implements certain functions of said at least one user terminal which must be performed relatively rapidly, and wherein said at least one user terminal further comprises:
   g) microprocessor means for running the application programs downloaded from said at least one network host computer, said microprocessor means implementing functions which can be performed less rapidly.

3. The system of claim 2, wherein said programmable gate array performs the functions of memory control and timing.

4. The system of claim 2, wherein said programmable gate array performs the function of parity checking.

5. The system of claim 1, wherein said at least one user terminal further comprises:
   g) additional memory means for receiving and storing configuration code downloaded from said at least one network host computer.

6. The system of claim 5, wherein said additional memory means comprises and electrically erasable read-only memory electrically erasable in response to a signal received from said at least one network host computer.

7. The system of claim 1, wherein said at least one user terminal further comprises:
   g) additional memory means for permanently storing instructions for receiving downloaded configuration code; and
   h) processor means for reconfiguring said programmable gate array in response to the instructions stored in said additional memory means.

8. The system of claim 7, wherein the said additional memory means comprises permanently written read-only memory.

9. A user terminal in the form of a telephone, for use in connections with a system for providing access from one or more user terminals to a plurality of service computer systems each supporting at least one consumer service, said user terminal comprising a telephone including:
   a receiver capable of receiving and transmitting audio and digital information;
   display means for displaying information and prompts to a user;
   input-acceptance means for accepting user input from the user entered in response to information and prompts displayed by said display means, said acceptance means including a conventional telephone keypad;
   processor means for generating and transmitting messages to a remote network host computer in response to user input entered into said input-acceptance means;
   programmable gate array means for performing one or more of a plurality of separate hardware-implementing functions, said programmable gate array means being remotely reconfigurable in response to a reconfiguration code received from a remote location, to make said user terminal compatible with a service computer system selected for access by a user;
   first memory means for storing said reconfiguration code; and
   second memory means for storing applications programs used by said processor means and received from a remote location.

10. The terminal of claim 9, wherein said first memory means further stores software downloaded from the network host, and wherein said terminal further comprises alteration means for altering terminal functions applicable to multiple application programs in response to software downloaded from the network host and stored in said first memory means.

11. The terminal of claim 10, wherein said first memory means comprises read-only memory which is erasable in response to a signal received from a remote location.

12. The terminal of claim 10, wherein said second memory means comprises read-only memory which is erasable for storing application programs downloaded from a network host computer in response to selection of a service computer by a user.

13. The terminal of claim 9, further comprising third memory means for storing microcode for implementing fundamental input and output functions, including receiving and storing the reconfiguration code and for reconfiguring said programmable gate array means in response to the reconfiguration code.

14. A user terminal for use in connection with a distributed-intelligence computer system including a network host computer and a plurality of service computers each supporting at least one consumer service, said terminal being configured to resemble a conventional telephone and comprising:
   a receiver capable of receiving and transmitting audio and digital information;
   a programmable gate array including a plurality of logic elements remotely reconfigurable in response to a sequence of reconfiguration signals, to make said terminal compatible with a service computer selected by a user;
   first memory means for storing reconfiguration signals received from the network host computer;
   second memory means for storing an application program downloaded from the network host computer;
   third memory means for storing signals for controlling operation of said first and second memory means;
   processor means for controlling configuration of said programmable gate array in response to reconfiguration signals received from the network host computer;
   display means for displaying information and requests for input data to user; and
   input means for receiving input data form the user, said input means including a conventional telephone keypad.

15. The terminal of claim 14, further comprising telephone means for performing conventional telephonic functions.

16. The terminal of claim 14, wherein said first memory means comprises a read-only memory which is remotely erasable in response to a signal from the network host computer.

17. The terminal of claim 14, wherein said third memory means comprises a permanently written, read-only memory.

18. In a distributed-intelligence computer system comprising a network host computer, a plurality of service computers each supporting at least one consumer service, and a plurality of user terminals, a method of controlling a user terminal, the user terminal comprising a telephone including a conventional telephone keypad, a receiver capable of receiving and transmitting audio and digital information, display means for displaying information and prompts to a user, acceptance means for accepting user input from the user in response to the information and prompts, processor means for generating and transmitting messages to a remote network host responsive to the user input, first memory means for storing application programs used by the processor means, programmable gate array means reconfigurable by reconfiguration code for performing one or more of a plurality of separate hardware-implemented functions, and second memory means for storing the reconfiguration code, the method comprising the steps of:
   a) in response to selection of one of the plurality of service computers for access by a user, download application software to the user terminal for supporting communication between the user terminal, the network host computer, and the service computer;
   b) following said step a), downloading terminal operating software to the user terminal to modify software-implemented operating procedure of the terminal;
   c) following said step b), downloading reconfiguration code to the user terminal and remotely updating the hardware-implemented functions of the programmable gate array means by reconfiguring the programmable gate array means in response to the reconfiguration code, to make the user terminal compatible with the service computer selected by the user; and
   d) following said step c), operating the user terminal using the downloaded software, the terminal operating software, and the reconfiguration code.

19. A Distributed-intelligence computer system comprising:
- a network host computer including first memory means for storing a plurality of application programs and second memory means for storing reconfiguration signals;
- a plurality of service computers each supporting at least one consumer service;
- a plurality of user terminals, each said user terminal comprising a telephone including a conventional telephone keypad, a receiver capable of receiving and transmitting audio and digital information, and a programmable gate array remotely reconfigurable in response to reconfiguration signals downloaded from said second memory means of said network host computer, to make said terminal compatible with a service computer selected from access by a user;
- means for carrying out a first protocol for maintaining communication between said plurality of user terminals and said network host computer;
- means for carrying out a second protocol for maintaining communication between said plurality of service computers and said network host computer;
- means for downloading an application program from said first memory means of said network host computer to a particular one of said plurality of user terminals in response to a request from said particular one terminal for access to one of said plurality of service computers; and
- means for downloading reconfiguration signals from said second memory means of said network host computer to said plurality of user terminals as needed to reconfigure said plurality of user terminals.

* * * * *